United States Patent Office 2,867,592
Patented Jan. 6, 1959

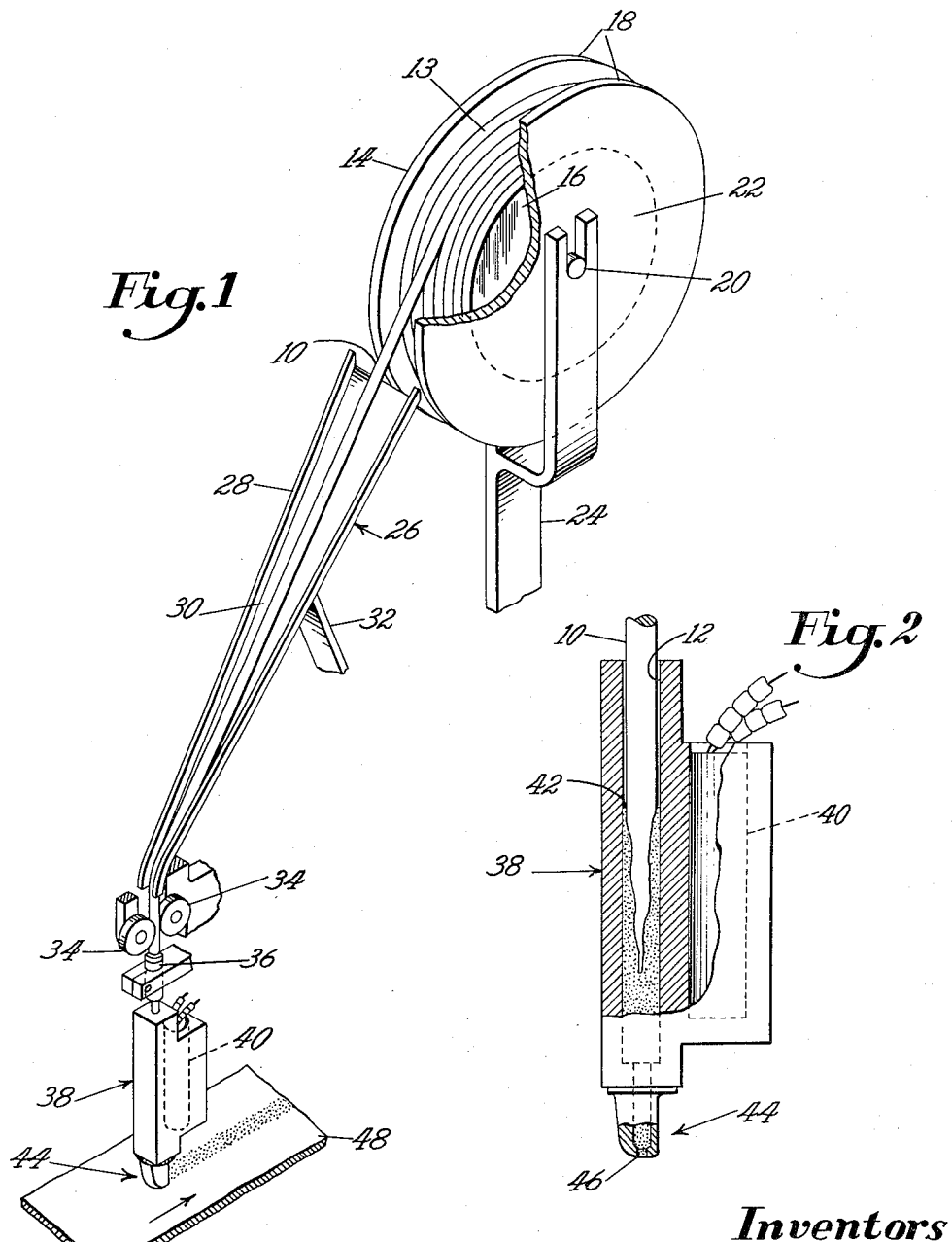

2,867,592

THERMOPLASTIC POLYAMIDE-EPOXY ADHESIVES

Thomas C. Morris, Lexington, Mass., and Adolph M. Chaplick, Hudson, N. H., assignors to B. B. Chemical Co., Boston, Mass., a corporation of Massachusetts Application May 7, 1954, Serial No. 428,304

6 Claims. (Cl. 260—18)

This invention relates to an improved thermoplastic adhesive and particularly to a thermoplastic rod adhesive for direct through feed dispensing.

As described more fully in the copending application Serial No. 377,162, filed August 28, 1953, in the names of Thomas C. Morris (one of the present inventors) and Eric C. Johnson, direct through feed thermoplastic adhesive dispensing is an operation in which solid adhesive material is supplied to a dispensing apparatus at the rate at which heat softened adhesive is applied to a work piece and in which the adhesive does not pass to a reservoir or other substantial body of adhesive held in molten condition out of the direct line of flow from the entry to the exit of the dispensing apparatus. In this operation there is an orderly progression of adhesive through a heated passageway to the point of application and no portion of the adhesive is subject to heating for an extended period. Adhesive is supplied to the system as an elongated body of solid thermoplastic adhesive constituting a self-supporting rod of uniform cross section for cooperation with a heated softening and dispensing passageway of which at least the entrance is complementary in cross section to the rod. For general use, rods of a wide variety of adhesive compositions may be used, provided that the rod be a thermoplastic adhesive composition, that it possess resistance to fracture at operational temperatures and that it be self-supporting and possess dimensional stability such that the rod or strip does not change during storage from the shape required for cooperation with the softening and dispensing passageway.

Thermoplastic adhesive rods are claimed in terms of important physical properties in the above referred to application. The present invention is based on the novelty of a chemical composition useful as a thermoplastic adhesive.

Polyamide resinous materials similar to the resins known as Norelac developed by the United States Department of Agriculture are useful in various hot melt adhesive problems because of their high strength and their ability to hold strongly to a wide variety of materials including paper, rubber, leather and metal. Some control over the melting point and rate of setting of these resinous materials is obtainable by such expedients as blending of resins of different melting points or addition of plasticizers. This blending or addition while capable of improving certain characteristics of the resinous material frequently alters other characteristics of the material in an undesirable manner. For example, addition of plasticizer may render the material less brittle but may adversely affect the dimensional stability of the material in solid form or may give undesirable flow characteristics in molten form. Blending of resins of different melting points may give a mixture having a desired melting and setting temperature but may be undesirably viscous in molten condition or excessively brittle in rod form. For the special adhesive problem of exceptional high rate bonding through use of the rod adhesive system, conventional expedients for modifying the characteristics of these resins have not been found adequate to give materials possessing dimensional stability in solid rod form together with fluidity in molten condition and controlled rapidity of setting which are important to take full advantage of the capabilities of the rod cement system.

It is a feature of the present invention to provide a new thermoplastic adhesive which may be softened by heat to a condition for effective application to a work piece and which sets in a very short interval of time after application to provide a strong bond.

It is a further feature to provide a new adhesive supply rod particularly adapted for precision bonding operations in a direct through feed adhesive dispensing and applying system.

We have found that polyamides from polymeric fat acids may be reacted with a controlled minor amount of polyepoxide resin materials which would be capable in larger amounts of curing the resin, to form new thermoplastic adhesive materials possessing desirable flow characteristics and freedom from gelling in heated condition and having dimensional stability at room temperature. The term "fat acid" designates any carboxylic acid which occurs either in free form or as an ester in fats and oils of vegetable and animal origin. Plasticizer may be incorporated in the reacted polyamide material to give improved properties without the objectionable softness at room temperature which would be found if substantial percentages of plasticizer were added to simple polyamide material of this type. We have found that rod adhesive composed of the new plasticized reaction product possesses to an exceptional degree the properties of rapid uniform setting up characteristics and strength together with a combination of dimensional stability, resistance to cracking, and low brittle temperature which render the rod outstanding in the special field of direct through feed adhesive dispensing.

The invention will be described further in connection with the accompanying drawings forming part of the disclosure in which, Fig. 1 is an angular view of the adhesive supply and control rod in coil form with a portion uncoiled and inserted into a passageway for softening and dispensing the adhesive; and Fig. 2 is a view with parts broken away of the adhesive rod disposed as a piston in a complementary passageway showing the cooperative relation between the body of solid adhesive and the walls of the passageway for controlling flow of adhesive through the passageway to the point of application.

As shown in Fig. 1 the thermoplastic adhesive rod 10 for direct through feed adhesive dispensing is an elongated self-supporting body of solid, thermoplastic adhesive having a substantially uniform gross cross section complementary to the cross section of the entrance to the heated softening and dispensing passageway 12. The solid self-supporting rod 10 is shown coiled in overlapping layers 13 on a spool 14 from which it is fed to the melting and dispensing passageway 12. The spool 14 comprises a relatively large diameter hub member 16 and side flanges 18 and is rotatably mounted on a supporting shaft 20 which is fitted in the slotted upper ends 22 of a bifurcated supporting bracket 24. The adhesive rod 10, after it is uncoiled from the spool, passes through a trough 26 having side walls 28 and a bottom wall 30 supported by a post 32 and into the bite of toothed or notched feed rolls 34 which firmly grip it for applying axial pressure to the rod 10. From the feed rolls 34 the rod 10 passes through a guide bushing 36 and into the entry end of the passageway 12 in the heating and applying member.

As shown in Fig. 2, the passageway 12 comprises a body portion 38 in one side of which is disposed a heating element 40 to supply heat through the body portion 38 to the passageway 12. The adhesive rod 10 effectively fills the entrance portion of the passageway 12, any slight gap between the rod 10 and the walls of the passageway 12 being sealed by softened or molten material 42. When moved forward the rod 10 bears uniformly against the full cross section of adhesive whether incompletely or wholly in fluid form in the forward portions of the passageway. The uniform bearing of the rod against the entire cross section of adhesive in the passageway insures orderly progress of adhesive through the passageway which constitutes an important advantage of direct through feed adhesive dispensing.

The effective seal between the solid rod and the walls of the passageway creates a relation between them such that as the rod 10 moves into the passageway 12 an equivalent volume of heat softened adhesive leaves the dispensing end 44 of the passageway 12 through opening 46 and is spread on a work piece 48 moving beneath it. When movement of the rod 10 is halted it aids in retaining softened adhesive within the passageway 12. Thus the rod 10 serves as a supply and/or control member in the direct through feed adhesive dispensing system and gives particularly advantageous operational characteristics when the system is used in combination with automatic or semi-automatic machines. To function as such control it is important that the rod have an indefinite length and it is necessary that the rod be capable of being uncoiled from the spool or reel 14 without cracking. It is also necessary that the rod in the coil retain its cross section substantially unchanged and that it not adhere to adjacent coils in order that the rod may be uncoiled from the spool in a cross sectional shape complementary to the cross sectional shape of the passageway 12.

The reaction product of a polyamide resin and controlled minor amount of a polyepoxide resin is outstanding in its possession of characteristics fitting it for use in a direct through feed adhesive dispensing and applying system. It is believed that active hydrogens, particularly on amino groups in the polyamide molecule, react with epoxide groups in a manner similar to the reaction between polyamine curing agents and epoxide groups. It appears that the polyepoxide resin in the proportions used links together small numbers of polyamide resin molecules to build up within the resin body molecules possessing a size and structure particularly effective to reinforce the resin internally without causing gelation. An adhesive rod of the reacted resin is stable against dimension change on long storage and is resistant to cracking when coiled and uncoiled. Additionally, the adhesive is improved over simple polyamide resins in strength and setting ability, and at the same time because of the groups introduced by the polyepoxide resin, the adhesive in molten form shows improved ability to wet and join intimately with such surfaces as leather, metal, and so on.

The polyamide for reaction with a polyepoxide resin to form the new adhesive for rod use may be any of a series of resinous materials formed by reaction of polymerized polyene fat acids or their amide forming derivatives such as their monohydric alcohol esters or their anhydrides or acyl halides with an organic aliphatic compound possessing at least two primary amino groups. The polymeric fat acids may be those formed for example by thermal polymerization of drying or semi-drying type fatty oils containing glycerides of polymerizable fat acids such as soybean oil, linseed oil, cottonseed oil, perilla oil, dehydrated castor oil and the like. The polymeric glyceride may then be isolated as by distillation and converted to polymeric fat acid by hydrolysis.

The polymerized fat acids, esters or anhydrides are combined with preferably equimolecular amounts of amino compounds such as ethylene diamine, diethylene triamine, hexamethylene diamine, tetraethylene pentamine or other alkylene polyamines, or mixtures of these with each other or with related compounds such as mono- ethanolamine. The combination reaction is brought about by heating the mixed materials at such a temperature that polyaminolysis of the fat esters or dehydration of the polyamine salts of the fat acids will occur readily. Temperatures of 150–175° C. for a few hours with 175°–225° C. for 20 to 40 minutes just prior to removal of polyamide from the reaction chamber are sufficient. The time and temperature will vary depending on the materials used and the type of product desired. Details of this resin forming process may be found in United States patent to Cowan et al. 2,450,940 of October 12, 1948.

Agents for reaction with the polyamide resins to improve flow characteristics and dimensional stability include, according to the present invention, polyepoxide resins, usually glycidyl polyethers of a polyhydric phenol, a polyhydric alcohol or both. The preferred resins are those having a relatively low molecular weight and containing a relatively large proportion of active epoxide groups for reaction with active hydrogens of the polyamide. These polyepoxides are complex resinous materials and may be produced by the reaction of polyhydric phenols with a polyfunctional chlorhydrin such as epichlorhydrin and glycerol dichlorhydrin. The chlorhydrin is employed in proportion in excess of a molecular equivalent of the phenolic material and may be employed in amount up to twice the equivalent of the phenolic material, for example 2 mols of epichlorhydrin may be reacted with one mol of diphenylol propane in the presence of caustic alkali in excess of the amount required to combine with the halogen of the epichlorhydrin. On heating to about 100° C. there is formed a resinous complex polymeric material containing both terminal epoxy groups and terminal primary hydroxyl groups. Polyhydric phenols for use in forming these resins include in addition to diphenylol propane such polyhydric phenol materials as bis phenol, hydroquinone, resorcinol and others. Complex epoxides useful for reaction with amides may also be made by reacting polyhydric phenols with simpler polyepoxides to give complex polyepoxides. For example, glycerin or trimethylol propane may be reacted with epichlorhydrin to give a simple polyepoxide which may then be reacted with dihydric phenols to form useful complex polyepoxide resins. The preparation of epoxide resins is shown in United States Patents Nos. 2,506,486 to Bender et al., issued May 2, 1950, and 2,589,245 to Greenlee, issued March 18, 1952.

An important factor in the combination of polyamide resins with epoxide resins to obtain the advantages of the present invention is control of the relative proportions of polyamide resin and epoxide resin. It is believed that where the proportion of epoxide resin is within limited small proportion, the epoxide is effective to link small numbers of polyamide resin molecules together without providing such cross linking as would cause curing to thermoset condition or the development of a gel forming molecular skeleton throughout the mass of the resin.

Polyamide resins and epoxide resins vary in their ability to interact. In the epoxide resins this variation is given by certain manufacturers in terms of "epoxide equivalent," that is the value obtained by dividing the molecular weight of the resin by the number of epoxy groups per molecule. For example, a number of epoxide resins manufactured by the Shell Chemical Corporation and useful in the present invention have properties as follows: Epon 562 is a liquid and has an epoxide equivalent of 140 to 165; Epon 828 has a melting point of from 8 to 12° C. and an epoxide equivalent of 190 to 210; Epon 834 has a melting point of 20 to 28° C. and an epoxide equivalent of from 225 to 290; Epon 864 follows. Epon 562 is a liquid and has an epoxide equivalent of 300 to 375; and Epon 1001 has a melting point of 64 to 76° C. and an epoxide equivalent of from 450 to 525. It is preferred to use resins with an epoxide equivalent of less than 600.

The ability of a polyamide resin to interact with epoxide resin to form the present compositions may be measured by titration of the reactive amine value of the resin. A procedure for determining the amine value involves solution of the polyamide in a solvent mixture comprising equal volumes of toluol, n-butanol and denatured ethyl alcohol. Solution is effected by a gentle warming of the solvent containing the resin sample in a flask equipped with a water cooled reflux condenser. When the sample is completely dissolved, the flask is allowed to cool slightly, bromcresol green (0.4% solution in water) is added together with further alcohol and the solution is titrated with 0.5 N-hydrochloric acid to the first yellow color free of green. The amine value is calculated from the equation:

$$\text{Amine value} = \frac{\text{ccs. of acid to titrate sample} \times \text{normality } (0.5) \times 56.1}{\text{sample weight}}$$

The factor 56.1 is equal to 1000 × the milliequivalent weight of potassium hydroxide. The amine value is obtained in terms of milligrams of potassium hydroxide equivalent to amine alkalinity present in one gram of sample. The amine value may also be expressed in terms of milligrams of $-NH_2$ present in one gram of sample by dividing the above value by 3.5.

Various polyamide resins evaluated by the above procedure gave amine values ranging from 2.8 to 90 and higher milligrams of potassium hydroxide per gram of sample or otherwise expressed, 0.8 to 25 and higher milligrams of $-NH_2$ alkalinity present in one gram of sample. The amine values when considered with the molecular weights of the polyamide resins which range from about 3000 to about 6500 seem to indicate that a substantial portion of the polyamide molecules present in the resins do not have reactive amine groups and hence do not combine with epoxide resins in the manner important for the compositions of the present invention. The improvement in properties of polyamide resin upon addition of epoxide resin is believed to be due to the linking together of small numbers of those polyamide molecules present in the polyamide resin which contain reactive amino groups for interaction with epoxide molecules. The linking together is believed to involve the reaction of epoxide molecules with amine groups on different polyamide molecules to join them together to form polymers composed of a small number of polyamide molecules. Gelation will occur where the concentration and/or size of polymer molecules becomes too great.

A polyamide having an amine value of 0.8 mg. of $-NH_2$ per gram of polyamide is only slightly improved by incorporation of even relatively large proportions of epoxide resin and is brought to gelation point only by an addition of a large excess of epoxide resin and a very long reaction time. For most purposes it is important to use polyamide resins or polyamide resin blends having an amine value in excess of about 1 mg. of $-NH_2$ per gram of polyamide.

Where the amine value is greater than 1, for example in the neighborhood of two or higher, there will be present sufficient reactive amine groups for reaction with epoxide groups such that the desired improvement in properties of the polyamide resin material is readily obtained by addition of controlled amounts of epoxide resin below the quantity of epoxide resin which will cause gelation. The concentration of polyamide-epoxide polymer material thus formed which can be reached without causing gelation is affected by the configuration, size and distribution of the polymer molecules and by the molecular weight of the original polyamide resin. For example, the configuration of polyamide-epoxide polymer molecules where the polyamide is formed with ethylene diamine is different from the configuration of a polyamide formed using diethylene triamine as the reactive amine; and the concentration of polyamide-epoxide polymer which may be present without causing gelation is different in the case of the two polyamide-epoxide polymers. Thus, substantially more epoxide resin may be added to a polyamide resin formed from polymeric soybean fatty acid and ethylene diamine having an amine equivalent of 1.9 mgs. $-NH_2$ per gram of resin than can be used with a resin formed by condensation of polymerized soybean oil fatty acid with diethylene triamine having an amine value of 25 mgs. $-NH_2$ per gram of resin. It is believed that this difference is due at least in part to different configurations of the polymer material formed.

The permissible upper limit for the quanity of epoxide to be added to selected polyamide resins or resin mixtures is evaluated by preparing a series of mixtures of the selected polyamide resin or blend of polyamide resins and a selected epoxide resin in varying relative proportions and heating these mixtures with agitation for one-half hour at 150° C. By this procedure there is obtained a value for the maximum proportion of epoxy resin which can be added without causing gelation. Having determined the reactivity of the selected polyamide resin or resin mixture with an epoxy resin of given epoxide equivalent, other epoxide resins may be substituted for that employed in the evaluation using proportions selected on the basis of the known reactivity of the epoxy resins as expressed in epoxide equivalent value. That is, the amount of epoxide resin required will vary as its epoxide equivalent value.

It is to be observed that for substitution of resins in proportions determined by relative epoxide equivalents it is important that the epoxide be distributed through the polyamide uniformly as by means of vigorous agitation to prevent localized interaction which would give a product of nonuniform characteristics. Lower epoxide equivalent value resins are more reactive than the higher equivalent value resins and if intermixing is not thorough and rapid the results obtained may suggest use of lower quantities of such epoxide resins than might be calculated from an evaluation of the polyamide resin with higher epoxide equivalent value resins. Difficulties from localized interaction may be reduced by diluting the epoxide resin with plasticizer before combining the epoxide and polyamide resins and/or by blending polyamide resins having different molecule configurations and different reactive amine contents prior to admixture of the epoxide resins.

For example, a first polyamide resin which would be gelled by a relatively small proportion of epoxide resin, i. e. where the polyamide-epoxide molecules have a character more effective to cause gelation, may be blended with a second polyamide of a different type which requires a larger proportion of epoxide resin, i. e. where the poyamide-epoxide molecules are less effective to cause gelation. It is to be noted that the quantity of epoxide resin which may be used with a blend of the first and second resins is not the simple sum of the quantities of epoxide resin permissible with each of the quantities of the respective polyamide resins since the polyamide-epoxide molecules formed by interaction of epoxide with the first polyamide are dispersed through the body of combined resins including both the first and second polyamides and hence may not cause gelation.

Gelation as used herein is defined as the state in which a 3/16" steel ball will not fall, or will not fall regularly, through a body of resin in a glass tube one inch in diameter at a temperature of 150° C. The amount of epoxide resin which is just sufficient to cause gelation is the amount which when heated in mixture with the polyamide will give a body of resin in which the steel ball will just begin to fall erratically under these conditions.

As a precaution, it is desirable to restrict the epoxy resin addition to not more than 90% of the amount which will just cause gelation. Smaller amounts of epoxy resin down to as little as ¼% by weight based on the weight of the polyamide resin may be employed if desired where the full dimension stabilizing effect of the reaction of epoxy resin and polyamide resin is not needed.

The preferred procedure for interacting polyamide resin and epoxy resin involves heating the polyamide resin alone to a temperature of about 150° C. and thereafter adding the determined proportion of epoxy resin in admixture with a plasticizer. There will ordinarily be incorporated from about 5% to about 15% by weight of plasticizer based on the weight of the polyamide resin. Greater or smaller percentages of plasticizer may be used or the plasticizer may be omitted where dimensional stability or cracking of a rod or other body of the adhesive are not problems. Any known relatively nonvolatile compatible plasticizer may be used, although for convenience in mixing it is preferred to use normally liquid plasticizers. Useful plasticizers include conventional plasticizers such as tributyl phosphate, mixed o- and p-N-ethyl toluene sulfonamide, N-acetyl monoethanolamine and others. The epoxy resin-plasticizer mixture is added to the molten polyamide resin slowly with vigorous agitation. When the addition is complete, the reaction mixture is heated for a time sufficient to complete the reaction. The time required may be as short as 15 minutes, but it is generally preferred to continue heating for ½ hour to one hour while maintaining the mixture at this temperature.

Preferably, the polyamide resin and epoxy resin with plasticizer will be combined in proportions which on reaction will give a viscosity such as to require from 6 to 30 seconds for the steel ball to fall four inches under the conditions described for determining gelation. When the ball does not fall regularly, that is, when the material is liverish, i. e. has a substantial quantity of gelled material present, it is considered that the material is unsatisfactory. The viscosity in centipoises of preferred materials falls within the range of about 1500 to 6500 centipoises at 150° C. as determined on the Brookfield viscometer.

The reacted mixture of the polyamide resin and epoxy resin may be extruded directly as a rod of uniform cross section for use in a direct through feed adhesive dispensing and applying device. Alternatively, the material may be cast in pans and thereafter used in a molten reservoir type of a cement applying machine or sheeted out on rolls and supplied to a worm type extrusion apparatus for forming a rod of adhesive for a direct through feed adhesive dispensing and applying device.

The following examples are given as of assistance in understanding and practicing the invention, but it is to be understood that the invention is not restricted to the specific procedures, reagents or proportions set forth in the examples:

*Example I*

| | Parts by weight |
|---|---|
| Polyamide A | 100 |
| Stabilizer A5 | 3 |
| Tributyl phosphate | 5 |
| Polyamide B | 5 |

The above polyamide resins are the reaction products of polymerized fatty acid from soybean oil with alkylene polyamine. Further details concerning the preparation and properties of this type of resin are in "Abstract Service" for 1944, page A–18–100, published by Interscience Publishing, Inc., New York, N. Y., and "Plastics Newsletter," September 11, 1944 ("Plastic No. 345"). Resin A, the product of reaction of dimerized soybean oil fatty acid with ethylene diamine, has an amine value of 1.9 mgs. of $-NH_2$ per gram of resin, an acid number of about seven, an ash content of 0.10 maximum, a specific gravity of .917, average molecular weight of 3000 to 6500 and a ball and ring softening point (A. S. T. M.) of 105° to 115° C. Resin B, the product of reaction of dimerized and trimerized soybean oil fatty acid with diethylene triamine, has an amine value of 25.0 mgs. of $-NH_2$ per gram of resin, an acid number of not more than 12, an ash content of 0.10 maximum, a specific gravity of .987, an average molecular weight of 3000 to 6500 and a ball and ring softening point (A. S. T. M.) of at least 43° C.

Stabilizer A5 is an epoxide resin composed of the diglycidyl ether made by reacting two mols of epichlorhydrin per mol of diphenylolpropane by a procedure similar to that outlined in column 5, lines 6 to 48, of United States Letters Patent No. 2,506,486, to Bender et al., granted May 2, 1950. It has a viscosity at 25° C., of 9000 to 17,000 cst., an epoxy equivalent value of 185 to 200 grams/gram mol epoxy, a maximum of 0.2% hydrolyzable chlorine and a specific gravity of 1.15 to 1.17.

The 100 parts of polyamide resin (A) from the reaction of dimerized soybean oil fatty acid with ethylene diamine was placed in a reaction vessel and heated to a temperature of 140° to 150° C. The diglycidyl ether (stabilizer A5) was thoroughly mixed with the tributyl phosphate and this mixture was added to the molten polyamide resin with vigorous agitation. The mixture was maintained at 140° to 150° C. for 15 minutes, at the end of which time the materials had reacted and the viscosity of the mixture increased from an initial value of four seconds determined by the falling ball method described above to approximately 20 seconds. Thereafter the polyamide resin (B) reaction product of dimer and trimer of soybean oil fatty acid with diethylene triamine was added to the mixture and heating continued for five minutes with continued vigorous agitation. The reacted resin was then extruded as a ¼" rod. The rod was flexible and non-brittle so that it could readily be coiled on a reel and uncoiled for use when needed and had a brittle temperature, i. e. temperature above which the rod may be bent sharply about a 1" radius of 50° F. The rod was found to operate successfully in a direct through feed melting and applying system and possessed outstanding strength and toughness particularly in bonding leather.

*Example II*

75 parts of polyamide resin (C) obtained by the reaction of dimerized soybean oil fatty acid with ethylene diamine, and similar in softening point, molecular weight, acid number and specific gravity to polyamide A but having an amine value of only 0.8 mg. of $-NH_2$ per gram of resin, was placed in a reaction vessel and heated to a temperature of 140° to 150° C. To the molten resin there was then added 20 parts of polyamide resin (B) obtained by the reaction of dimerized and trimerized soybean oil fatty acid with diethylene triamine. The mixture was heated with vigorous agitation for 30 minutes while maintaining the temperature at 140° to 150° C.

One part of epoxide resin (stabilizer A5) was combined with six parts of a plasticizer comprising a mixture of ortho- and para-N-ethyltoluene sulfonamides (santicizer No. 8) and the mixture stirred to effect solution of the resin in the plasticizer. This mixture was then added slowly to the melted mixture of polyamide resins with continued vigorous agitation. Agitation was continued for 20 minutes while the temperature was maintained at 150° C. in the course of which time a reaction occurred in which the viscosity of the mixture increased substantially. The molten reacted resin was then extruded as a ¼" round rod. The rod was flexible and non-brittle so that it could be readily coiled on a reel and uncoiled for use when needed. The material had a brittle temperature of about 50° F. The rod operated successfully in a direct through feed melting and applying system and formed a tough, strong bond with such materials as leather, paper, metal and the like.

*Example III*

| | Parts by weight |
|---|---|
| Polyamide A | 90 |
| Tributyl phosphate | 6 |
| Polyamide B | 5 |
| Epon 864 | 4.25 |

The polyamide resin (A) was heated to 150° C. in a glass lined reaction vessel. Thereafter the epoxide resin (Epon 864) was mixed with the tributyl phosphate and the mixture was added to the reaction product in the reaction vessel with vigorous agitation and heated for fifteen minutes at 140° to 150° C. Thereafter the polyamide resin (B) was added to the mixture and heating continued with vigorous agitation for five minutes. The mixture was extruded as a ⅛" rod at an extrusion temperature of 180° to 190° F. This material is useful as a rod type adhesive for the bonding of paper and leather.

*Example IV*

|  | Parts by weight |
|---|---|
| Polyamide A | 525 |
| Polyamide B | 30 |
| A mixture of o-p-N-ethyl toluene sulphonamides (santicizer #8) | 75 |
| Stabilizer A5 | 15 |
| Polymerized rosin (polypale resin) | 52.5 |

The polyamide resins and the polymerized rosin were melted together at a temperature of 150° to 160° C. The stabilizer A5 was added slowly with vigorous agitation and the mixture maintained at the same temperature for ten minutes with continued agitation. The sulphonamide material was then added and mixed in thoroughly. The material was extruded as a ¼" rod at a temperature of 140° to 155° F. The resulting rod had a brittle point of 40° F. and was useful in a direct through feed dispensing system for sealing cardboard boxes.

*Example V*

|  | Parts by weight |
|---|---|
| Polyamide A | 90 |
| Epon resin 562 | 2 |
| Tributyl phosphate | 6 |
| Polyamide resin B | 5 |

These components were combined and reacted in accordance with the procedure set out in Example I and extruded as a ¼" rod adhesive useful for bonding paper and leather.

*Example VI*

|  | Parts by weight |
|---|---|
| Polyamide A | 90 |
| Polyamide B | 10 |
| Stabilizer A5 | 2.75 |
| Tributyl phosphate | 7 |

The polyamide resins were melted and mixed together at a temperature of 150° C. The stabilizer A5 was then dissolved in the tributyl phosphate and the solution was added to the mixture with rapid agitation. Heating of the mixture was continued for 15 minutes at 150° C. with continued agitation and the material was then removed from the reaction vessel. Thereafter the material was extruded at a temperature of 190° to 200° F. as a ¼" rod useful for bonding paper and leather. The cement had a falling ball viscosity of 18.4 seconds and a brittle temperature in rod form of about 50° F.

Having thus described the invention, what is claimed as new and desired to be secured by Letters Patent of the United States is:

1. A permanently fusible, thermoplastic adhesive comprising a resinous polyamide reaction product of a polymeric polyene fat acid and an alkylene polyamine possessing at least two primary amino groups, and a minor proportion of a resinous polyepoxide reacted with said polyamide, said polyamide having an amine value in excess of 1 mg. of —NH$_2$ per gram of polyamide, and said resinous polyepoxide being a resinous glycidyl polyether of a member of the group consisting of polyhydric phenols, polyhydric alcohols and mixtures of these, said resinous polyepoxide being present in amounts from ¼% by weight based on the weight of said polyamide to not more than about 90% of that quantity which will form in a mixture consisting of the polyamide and polyepoxide heated for one-half hour at 150° C. a gel structure in which a 3/16" steel ball will just begin to fall erratically through a body of the resin in a glass tube 1" in diameter at a temperature of 150° C., said polyepoxide serving to increase the dimensional stability and strength of the composition.

2. As an article of manufacture an elongated, flexible, self supporting, dimensionally stable, permanently fusible, thermoplastic adhesive rod capable of retaining its cross section substantially unchanged during storage, said adhesive rod comprising a resinous polyamide reaction product of a polymeric polyene fat acid and an alkylene polyamine possessing at least two primary amino groups, and a minor proportion of a resinous polyepoxide reacted with said polyamide, said polyamide having an amine value in excess of 1 mg. of —NH$_2$ per gram of polyamide, and said resinous polyepoxide being a resinous glycidyl polyether of a member of the group consisting of polyhydric phenols, polyhydric alcohols and mixtures of these, said resinous polyepoxide being present in amounts from ¼% by weight based on the weight of said polyamide to not more than about 90% of that quantity which will form in a mixture consisting of the polyamide and polyepoxide heated for one-half hour at 150° C. a gel structure in which a 3/16" steel ball will just begin to fall erratically through a body of the resin in a glass tube 1" in diameter at a temperature of 150° C., said polyepoxide serving to increase the dimensional stability and strength of the composition, said rod being fusible to a high viscosity liquid capable of wetting surfaces to be adhered.

3. As an article of manufacture an elongated, flexible, self supporting, dimensionally stable, permanently fusible, thermoplastic adhesive rod capable of retaining its cross section substantially unchanged during storage, said adhesive rod comprising a resinous polyamide reaction product of a polymeric polyene fat acid and an alkylene polyamine possessing at least two primary amino groups, from 5% to 15% by weight of said polyamide of a compatible plasticizer, and a minor proportion of a resinous polyepoxide reacted with said polyamide, said polyamide having an amine value in excess of 1 mg. of —NH$_2$ per gram of polyamide, and said resinous polyepoxide being a resinous glycidyl polyether of a member of the group consisting of polyhydric phenols, polyhydric alcohols and mixtures of these, said resinous polyepoxide being present in amounts from ¼% by weight based on the weight of said polyamide to not more than about 90% of that quantity which will form in a mixture consisting of the polyamide and polyepoxide heated for one-half hour at 150° C. a gel structure in which a 3/16" steel ball will just begin to fall erratically through a body of the resin in a glass tube 1" in diameter at a temperature of 150° C., said polyepoxide serving to increase the dimensional stability and strength of the composition, said rod being fusible to a high viscosity liquid capable of wetting surfaces to be adhered.

4. As an article of manufacture an elongated, flexible, self supporting, dimensionally stable, permanently fusible, thermoplastic adhesive rod capable of retaining its cross section substantially unchanged during storage, said adhesive rod comprising a resinous polyamide reaction product of a polymeric soybean oil acid and an alkylene polyamine possessing at least two primary amino groups, from 5% to 15% by weight of said polyamide of a compatible plasticizer, and a minor proportion of a resinous polyepoxide reacted with said polyamide, said polyamide having an amine value in excess of 1 mg. of —NH$_2$ per gram of polyamide, and said resinous polyepoxide being a resinous glycidyl polyether of a member of the group consisting of polyhydric phenols, polyhydric alcohols and mixtures of these, said resinous polyepoxide being present in amounts from ¼% by weight based on the weight of said polyamide to not more than about 90% of that quantity which will form in a mixture consisting of the polyamide and polyepoxide heated for one-half hour at 150° C. a gel structure in which a 3/16" steel ball will just begin to fall erratically through a body of the resin in a glass tube 1" in diameter at a temperature of 150° C., said polyepoxide serving to increase the dimensional stability and strength of the composition, said rod being fusible to a high viscosity liquid capable of wetting surfaces to be adhered.

5. As an article of manufacture an elongated, flexible, self supporting, dimensionally stable, permanently fusible, thermoplastic adhesive rod capable of retaining its cross section substantially unchanged during storage, said adhesive rod comprising a resinous polyamide reaction product of soybean oil acid dimer and ethylene diamine, from 5% to 15% by weight of said polyamide of a compatible plasticizer and a minor proportion of a resinous glycidyl polyether of diphenylolpropane, said polyamide having an amine value in excess of 1 mg. of —NH$_2$ per gram of polyamide, said resinous polyepoxide being present in amounts from 1/4% by weight based on the weight of said polyamide to not more than about 90% of that quantity which will form in a mixture consisting of the polyamide and polyepoxide heated for one-half hour at 150° C. a gel structure in which a 3/16" steel ball will just begin to fall erratically through a body of the resin in a glass tube 1" in diameter at a temperature of 150° C., said polyepoxide serving to increase the dimensional stability and strength of the composition, said rod being fusible to a high viscosity liquid capable of wetting surfaces to be adhered.

6. As an article of manufacture, an elongated, flexible, self supporting, dimensionally stable, permanently fusible, thermoplastic, adhesive rod capable of retaining its cross section substantially unchanged during storage, said adhesive rod comprising a resinous polyamide from the reaction of soybean oil acid dimer and ethylene diamine, a resinous polyamide from the reaction of mixed dimer and trimer of soybean oil acid and diethylene triamine, from 5% to 15% by weight of said polyamides of a compatible plasticizer and a minor proportion of a resinous glycidyl polyether of diphenylol propane, said polyamides having an amine value in excess of 1 mg. of —NH$_2$ per gram of polyamide, said polyether being present in amounts of from 1/4% by weight based on the weight of said polyamide to not more than about 90% of that quantity which will form in a mixture consisting of the polyamide and polyepoxide heated for one-half hour at 150° C. a gel structure in which a 3/16" steel ball will just begin to fall erratically through a body of the resin in a glass tube 1" in diameter at a temperature of 150° C., said polyepoxide serving to increase the dimensional stability and strength of the composition, said rod being fusible to a high viscosity liquid capable of wetting surfaces to be adhered.

References Cited in the file of this patent

UNITED STATES PATENTS

| | | |
|---|---|---|
| 2,450,940 | Cowan et al. | Oct. 28, 1948 |
| 2,589,245 | Greenlee | Mar. 18, 1952 |
| 2,705,223 | Renfrew et al. | Mar. 29, 1955 |

UNITED STATES PATENT OFFICE

CERTIFICATE OF CORRECTION

Patent No. 2,867,592                                        January 6, 1959

Thomas C. Morris, et al

It is hereby certified that error appears in the printed specification of the above numbered patent requiring correction and that the said Letters Patent should read as corrected below.

Column 4, line 71, strike out "follows. Epon 562 is a liquid and has" and insert instead -- has a melting point of 40° to 45° C. and --.

Signed and sealed this 8th day of September 1959.

(SEAL)
Attest:

KARL H. AXLINE
Attesting Officer

ROBERT C. WATSON
Commissioner of Patents